(12) United States Patent
Inoue et al.

(10) Patent No.: US 11,815,184 B2
(45) Date of Patent: Nov. 14, 2023

(54) SLIDING COMPONENT

(71) Applicant: Eagle Industry Co., Ltd., Tokyo (JP)

(72) Inventors: Hiroki Inoue, Tokyo (JP); Yuta Negishi, Tokyo (JP); Yuki Maetani, Tokyo (JP); Sayaka Miyazaki, Tokyo (JP)

(73) Assignee: EAGLE INDUSTRY CO., LTD.

( * ) Notice: Subject to any disclaimer, the term of this patent is extended or adjusted under 35 U.S.C. 154(b) by 219 days.

(21) Appl. No.: 17/296,466

(22) PCT Filed: Nov. 22, 2019

(86) PCT No.: PCT/JP2019/045728
§ 371 (c)(1),
(2) Date: May 24, 2021

(87) PCT Pub. No.: WO2020/110922
PCT Pub. Date: Jun. 4, 2020

(65) Prior Publication Data
US 2022/0010835 A1    Jan. 13, 2022

(30) Foreign Application Priority Data
Nov. 30, 2018 (JP) .................................. 2018-224490

(51) Int. Cl.
*F16J 15/34* (2006.01)

(52) U.S. Cl.
CPC ......... *F16J 15/342* (2013.01); *F16J 15/3412* (2013.01); *F16J 15/3416* (2013.01)

(58) Field of Classification Search
CPC .... F16J 15/3412; F16J 15/3416; F16J 15/342; F16J 15/3424
See application file for complete search history.

(56) References Cited

U.S. PATENT DOCUMENTS

| 3,085,808 | A | 4/1963 | Williams | 277/388 |
| 3,232,680 | A | 2/1966 | Clark | 384/110 |
| 3,410,565 | A | 11/1968 | Williams | 277/348 |
| 3,466,052 | A | 9/1969 | Ludwig | |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980076998.4 (with translation), dated Jan. 18, 2023, 12 pages.

(Continued)

*Primary Examiner* — Nicholas L Foster
(74) *Attorney, Agent, or Firm* — HAYES SOLOWAY P.C.

(57) ABSTRACT

A sliding component includes a dynamic pressure generation groove configured for generating dynamic pressure on a sliding surface, which groove includes an introduction port formed in one end side of the groove in a circumferential direction and which is open to a sealing target fluid H side, a throttle portion communicating with the introduction port and having a narrowed flow path, and a lead-out port formed on the other end side of the groove, which communicates with the throttle portion and which is open to the sealing target fluid side.

25 Claims, 11 Drawing Sheets

(56) References Cited

U.S. PATENT DOCUMENTS

| | | | |
|---|---|---|---|
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,804,424 A | 4/1974 | Gardner | 277/27 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. F16J 15/34 | |
| 9,062,775 B2 | 6/2015 | Short et al. | F16J 15/34 |
| 9,353,865 B2 | 5/2016 | Lattin | F16N 21/00 |
| 9,353,867 B2* | 5/2016 | Itadani | F16J 15/3412 |
| 9,371,912 B2 | 6/2016 | Hosoe et al. | F16J 15/34 |
| 9,587,745 B2 | 3/2017 | Itadani et al. | F16J 15/3412 |
| 9,677,670 B2 | 6/2017 | Itadani et al. | F16J 15/34 |
| 9,829,109 B2 | 11/2017 | Itadani et al. | F16J 15/3412 |
| 9,845,886 B2* | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2* | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2* | 5/2021 | Itadani | F16J 15/3284 |
| 11,125,335 B2 | 9/2021 | Kimura et al. | F16J 15/34 |
| 11,221,071 B2* | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0141789 A1 | 6/2005 | Kita et al. | F16C 32/06 |
| 2005/0212217 A1 | 9/2005 | Tejima | 277/399 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1* | 12/2015 | Itadani | F16J 15/3412 277/400 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0198814 A1 | 7/2017 | Colombo et al. | F16J 15/3412 |
| 2017/0234431 A1 | 8/2017 | Katori et al. | F16J 15/3412 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2021/0080006 A1* | 3/2021 | Sasaki | F16J 15/324 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0275828 A1 | 9/2022 | Inoue | F16J 15/3424 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 36 19 489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 3926188 | 12/2001 | F16C 17/04 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3943765 | 1/2022 | F16C 17/04 |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |

(56) References Cited

FOREIGN PATENT DOCUMENTS

| | | | |
|---|---|---|---|
| JP | S63-190975 | 8/1988 | ............... F16J 15/34 |
| JP | H01133572 | 9/1989 | ............... F16J 15/34 |
| JP | 2-236067 | 9/1990 | ............... F16J 15/34 |
| JP | 3-14371 | 2/1991 | ............... F16J 15/34 |
| JP | 3-35372 | 4/1991 | ............... F16J 15/34 |
| JP | 3-41267 | 4/1991 | ............... F16J 15/34 |
| JP | 3-41268 | 4/1991 | ............... F16J 15/34 |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05-322050 | 12/1993 | ............... F16J 15/34 |
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............... F16C 17/10 |
| JP | 2001-295833 | 10/2001 | ............... F16C 17/04 |
| JP | 2001-317638 | 11/2001 | ............... F16J 15/34 |
| JP | 2003-161322 | 6/2003 | ............... F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............... F16C 33/74 |
| JP | 2006-9828 | 1/2006 | ............... F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............... F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011-185292 | 9/2011 | ............... F16J 15/34 |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| WO | WO 95/06832 | 3/1995 | ............... F16J 15/34 |
| WO | WO 2012/046749 | 4/2012 | ............... F16J 15/34 |
| WO | WO 2014/024742 | 2/2014 | ............... F16J 15/34 |
| WO | WO 2014/050920 | 4/2014 | ............... F16J 15/34 |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | WO 2016/009408 | 1/2016 | ............... F16J 15/34 |
| WO | WO 2016/035860 | 3/2016 | ............... F16J 15/34 |
| WO | WO2016035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............... F16C 33/10 |

OTHER PUBLICATIONS

Chinese Office Action issued in application No. 201980059152.X (with translation), dated Oct. 10, 2022, 14 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/628,158, dated May 15, 2023, 14 pages.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,986, filed Aug. 10, 2021, Suzuki et al.
U.S. Appl. No. 17/603,561, filed Oct. 13, 2021, Imura et al.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).

(56) References Cited

OTHER PUBLICATIONS

Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminar Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
International PreliminaryReport on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Pmliminaty Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PC/JP2019/038155, dated Nov. 19, 2019, with English translation, 18 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980087670.2 (with translation), dated Jul. 1, 2022 (17 pgs).
Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/429,896, filed Aug. 10, 2021, Suzuki et al.
U.S. Appl. No. 17/628,158, filed Jan. 18, 2022, Inoue et al.
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
Chinese Office Action issued in application No. 201980059152.X (with translation), dated May 8, 2023, 11 pages.
Chinese Office Action issued in application No. 201980082245.4 (with translation), dated Aug. 3, 2023, 25 pages.
European Official Action issued in application No. 19876680.0, dated Aug. 24, 2023, 8 pages.
Korean Official Action issued in Korean Patent Application Serial No. 10-2021-7028879, dated Jun. 28, 2023, 10 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Official Action issued in related U.S. Appl. No. 17/428,909, dated Jul. 25, 2023, 8 pages.
European Search Report issued in application No. 20847261.3, dated Jul. 17, 2023, 8 pages.

* cited by examiner

SLIDING COMPONENT

TECHNICAL FIELD

The present invention relates to a sliding component having a sliding surface, examples of which include a mechanical seal and a bearing.

BACKGROUND ART

The performance of a sliding component is often evaluated in terms of the amount of leakage, the amount of wear, and torque. In the related art, low leakage, long life, and low torque are realized by friction being reduced by fluid interposition between sliding surfaces and liquid leakage from a sliding surface being prevented and, in a mechanical seal, by performance enhancement through sliding material or sliding surface roughness optimization. However, further mechanical seal performance improvement is required with the awareness of environmental issues in recent years growing. Existing mechanical seal-related inventions include one in which a dynamic pressure generation groove is provided in the sliding surface of a rotating ring as a sliding component (See, for example, Patent Citation 1).

CITATION LIST

Patent Literature

Patent Citation 1: JP H4-73 A (Page 2, FIG. 17)

SUMMARY OF INVENTION

Technical Problem

No leakage occurs when such a mechanical seal is stationary. During rotation, including the initial stage of rotation, such a mechanical seal operates by fluid lubrication and prevents leakage to achieve both sealing and lubrication while having low friction. A method for this friction reduction is achieved by a dynamic pressure generation groove being formed in a sliding surface, a positive pressure being generated by a fluid that has intruded into the dynamic pressure generation groove of the sliding surface as a result of rotation, and sliding being performed with a liquid film interposed between the sliding surfaces as a result. However, in this type of mechanical seal, foreign matter may intrude into the dynamic pressure generation groove together with the sealing target fluid on the high-pressure side and adhere and stay. This foreign matter may lead to an insufficient dynamic pressure on the sliding surface, damage to the sliding surface, and poor durability.

The present invention has been made in view of such problems, and an object of the present invention is to provide a sliding component capable of preventing foreign matter from staying in a dynamic pressure generation groove and realizing low leakage, long life, and low torque over a long period of time.

Solution to Problem

In order to solve the above problem, a sliding component according to the present invention is a sliding component including a dynamic pressure generation groove configured for generating a dynamic pressure on a sliding surface of the sliding component, wherein the dynamic pressure generation groove includes: an introduction port which is formed in a first end side of the dynamic pressure generation groove in a circumferential direction and which is open to a sealing target fluid side; a throttle portion communicating with the introduction port and having a narrowed flow path; and a lead-out port which is formed on a second end side of the dynamic pressure generation groove opposed to the first end side in the circumferential direction, which communicates with the throttle portion and which is open to the sealing target fluid side. According to the aforesaid feature of the present invention, the lead-out port of the dynamic pressure generation groove communicates with the sealing target fluid side, and thus foreign matter that has intruded into the dynamic pressure generation groove from the introduction port can be discharged to the sealing target fluid side through the lead-out port and the foreign matter is prevented from staying in the dynamic pressure generation groove. As a result, it is possible to realize low leakage, long life, and low torque over a long period of time.

It may be preferable that the sliding component further includes at least another dynamic pressure generation groove, the dynamic pressure generation grooves are arranged in the circumferential direction in the sliding surface, and the lead-out port of one of adjoining two of the dynamic pressure generation grooves and the introduction port of remaining one of the adjoining two of the dynamic pressure generation grooves communicate with each other. According to this preferable configuration, the adjoining two dynamic pressure generation grooves are capable of communicating with each other and the fluidity of the foreign matter contained in the sealing target fluid can be enhanced.

It may be preferable that the dynamic pressure generation grooves communicate in an annular shape over an entire circumference of the sliding surface. According to this preferable configuration, foreign matter that has intruded into the annular dynamic pressure generation groove from the introduction port is discharged from any of the lead-out ports while annularly circulating in the dynamic pressure generation groove. Accordingly, the foreign matter is unlikely to stay in the dynamic pressure generation groove.

It may be preferable that the sliding component further includes at least another dynamic pressure generation groove, the dynamic pressure generation grooves are arranged in the circumferential direction in the sliding surface, and adjoining two of the dynamic pressure generation grooves are separated from each other in the circumferential direction. According to this preferable configuration, lubricity is enhanced by the plurality of dynamic pressure generation grooves. In addition, the part where the dynamic pressure generation grooves are separated from each other is capable of maintaining sealability.

It may be preferable that the introduction port is formed so as to be a deep groove deeper than the throttle portion. According to this preferable configuration, a large amount of sealing target fluid can be introduced toward the throttle portion from the introduction port formed in the deep groove.

It may be preferable that the lead-out port is formed so as to be a deep groove deeper than the throttle portion. According to this preferable configuration, the lead-out port formed by the deep groove achieves the effect of a pressure release groove and the sealing target fluid and the foreign matter contained in the sealing target fluid are led out with ease.

It may be preferable that the introduction port, the throttle portion, and the lead-out port are formed so as to be equal to each other in depth. According to this preferable configuration, foreign matter that has intruded from the introduction port can be smoothly discharged to the lead-out port.

It may be preferable that the dynamic pressure generation groove further includes at least another lead-out ports. According to this preferable configuration, foreign matter that has intruded from the introduction port can be easily discharged via the plurality of lead-out ports.

It may be preferable that the throttle portion is curved from an inner diameter side toward an outer diameter side of the sliding surface as the throttle portion extends to the lead-out port. According to this preferable configuration, the sealing target fluid and the foreign matter contained in the sealing target fluid are easily discharged from the lead-out port by centrifugal force during sliding.

DESCRIPTION OF EMBODIMENTS

Modes for implementing the sliding component according to the present invention will be described below based on embodiments.

First Embodiment

The sliding component according to the first embodiment of the present invention will be described with reference to FIGS. 1 to 3. It should be noted that the right side of the page of FIG. 1 is an atmospheric side and the left side of the page is an intra-machine side in the following description of the present embodiment.

Figure 1:
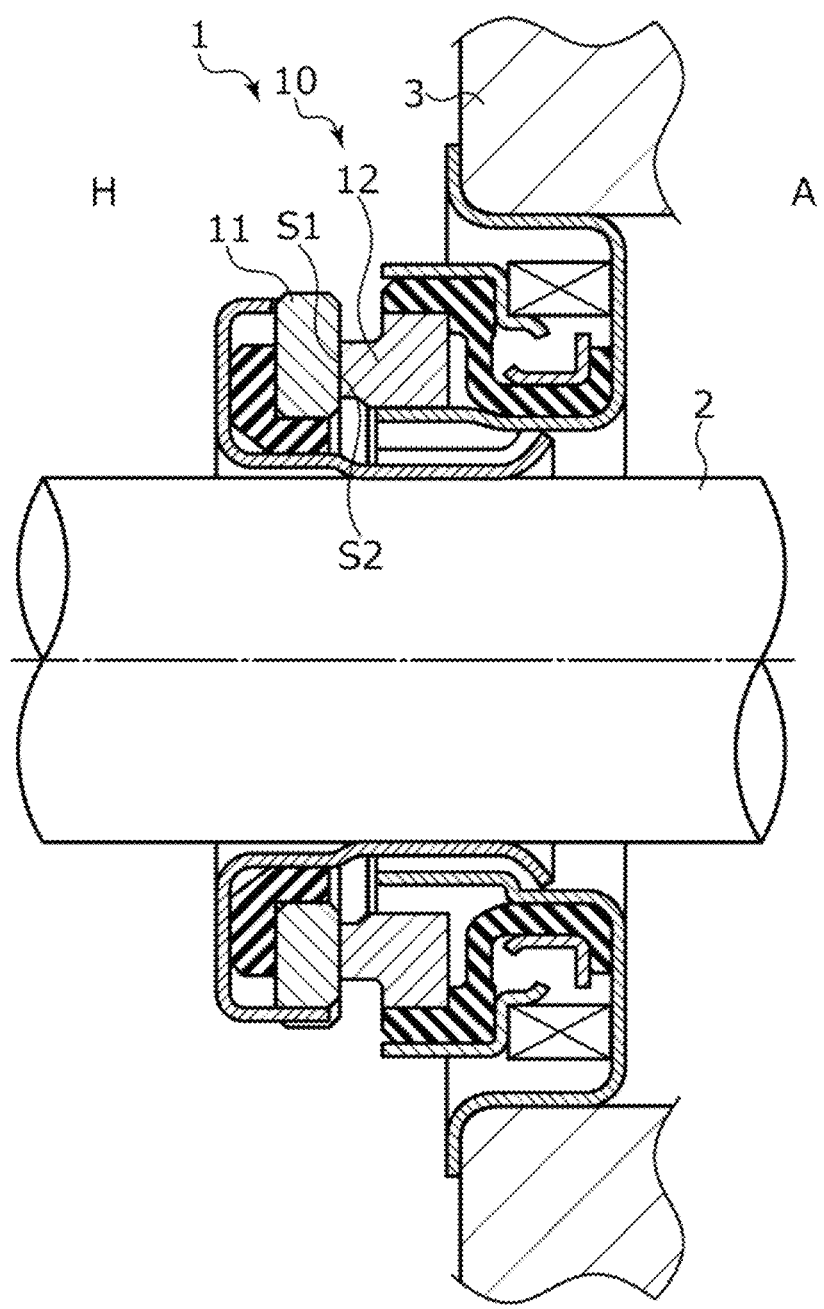
FIG. 1 is a cross-sectional view illustrating a mechanical seal to which the sliding component according to a first embodiment of the present invention is applied.

As illustrated in FIG. 1, a sliding component 1 according to the first embodiment of the present invention is a rotating seal ring 11 and a fixed seal ring 12 in a mechanical seal 10 and is provided between a rotary shaft 2 of a rotating machine such as a pump (not illustrated) and a compressor (not illustrated) and a seal cover 3 fixed to the housing of the rotating machine. The mechanical seal 10 includes a stationary side element having the circular ring-shaped fixed seal ring 12 fixed to the seal cover 3 and a rotating side element rotating together with the rotary shaft 2. A sliding surface S1 of the fixed seal ring 12 and a sliding surface S2 of the rotating seal ring 11 are slid closely with each other, the sealing target fluid on the intra-machine high-pressure fluid side (hereinafter, referred to as the high-pressure fluid H side) is shaft-sealed, and leakage to the atmosphere A side is prevented. It should be noted that the mechanical seal 10 is configured as a balanced mechanical seal in which the balance of the pressure of the sealing target fluid acting on the fixed seal ring 12 and the rotating seal ring 11 is constant on both sides in the axial direction.

The fixed seal ring 12 and the rotating seal ring 11 are typically formed of a combination of SiC (as an example of hard material) or a combination of SiC (as the example of hard material) and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
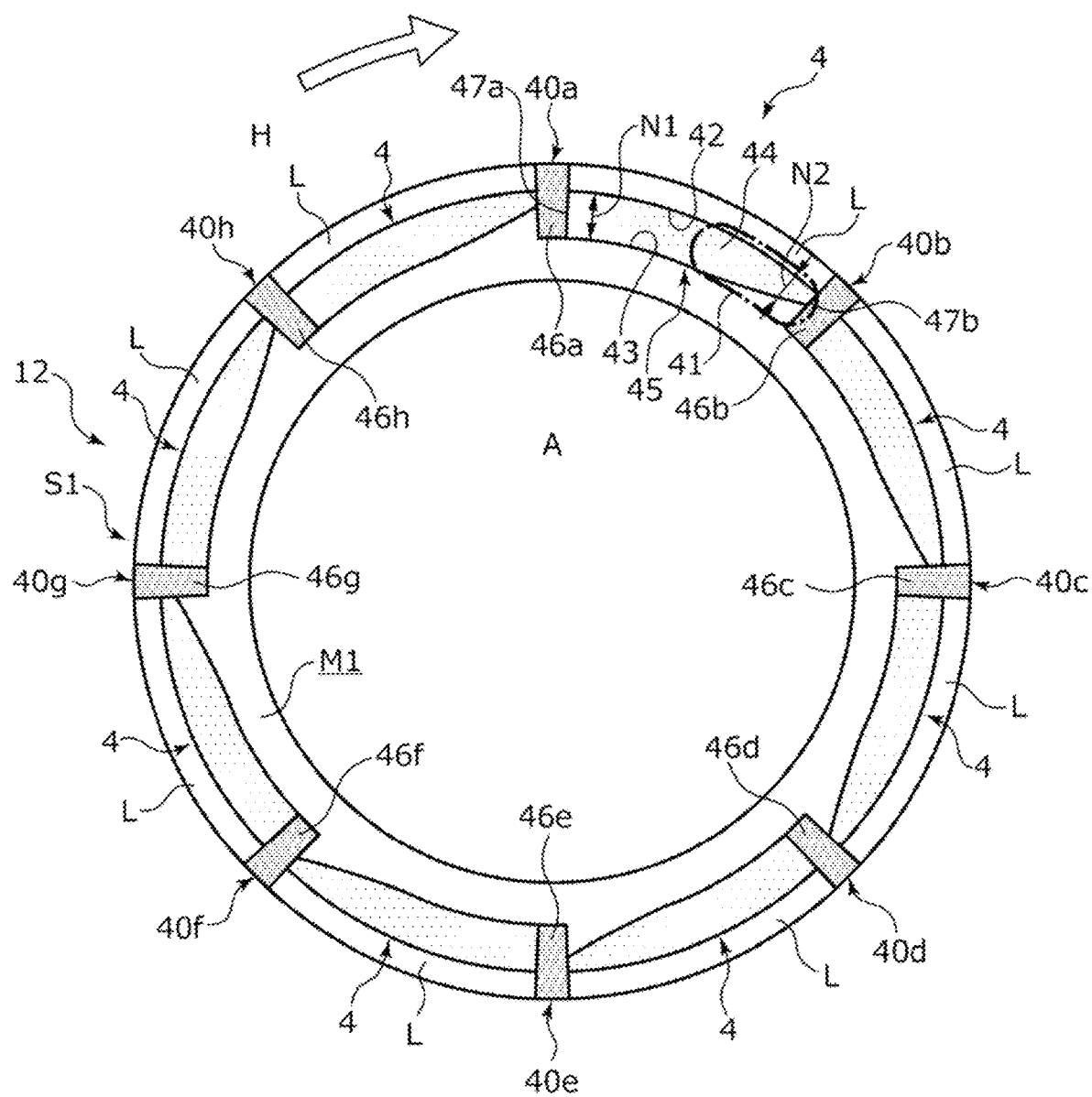
FIG. 2 is a front view illustrating a sliding surface provided with the dynamic pressure generation groove in the first embodiment.

As illustrated in FIG. 2, the fixed seal ring 12 is formed in an annular shape so as to surround the rotary shaft 2 and a dynamic pressure generation groove 4 is formed on the sliding surface S1 by surface texturing or the like. It should be noted that the rotating seal ring 11 disposed so as to face the sliding surface S1 of the fixed seal ring 12 is provided so as to rotate clockwise (i.e., in the illustrated arrow direction) with respect to the fixed seal ring 12.

The sliding surface S1 of the fixed seal ring 12 includes a plurality of the dynamic pressure generation grooves 4 arranged along the circumferential direction and a flat seal surface M1 formed on the inner diameter side as compared with the dynamic pressure generation grooves 4. Each dynamic pressure generation groove 4 mainly includes a communication port 40a as an introduction port opening at the outer diameter end and communicating with the fluid H side, a communication groove 46a extending in the inner diameter direction from the communication port 40a, a flow path portion 45 communicating with the communication groove 46a and extending in the circumferential direction of the fixed seal ring 12, a communication groove 46b communicating with the flow path portion 45 and extending in the outer diameter direction, and a communication port 40b as a lead-out port opening at the outer diameter end of the communication groove 46b and communicating with the fluid H side. In addition, the sliding surface S1 includes a seal surface L on the outer diameter side surrounded by the communication groove 46a, the flow path portion 45, and the communication groove 46b and is formed at the same height as the seal surface M1.

The flow path portion 45 includes a throttle portion 41, which gradually decreases in width from the communication groove 46a side toward the communication groove 46b side along the circumferential direction. Specifically, the flow path portion 45 includes an outer wall portion 42 on the outer diameter side of the fixed seal ring 12, an inner wall portion 43 on the inner diameter side of the fixed seal ring 12, and a flat bottom surface portion 44 parallel to the seal surface M1 and the narrow throttle portion 41 is formed by the inner wall portion 43 gradually approaching the outer diameter side along the circumferential direction with respect to the outer wall portion 42 extending in the circumferential direction in a circular arc shape concentric with the fixed seal ring 12. The bottom surface portion 44 of the flow path portion 45 is formed on a flat surface having a constant depth shallower than the bottom surface of the communication groove 46a up to the throttle portion 41. In addition, the communication groove 46a is a groove deeper than the bottom surface portion 44 of the flow path portion 45 and a step portion 47a is formed at the boundary between the communication groove 46a and the bottom surface portion 44 of the flow path portion 45. Further, the communication groove 46b is a groove deeper than the bottom surface portion 44 of the flow path portion 45 and a step portion 47b is formed at the boundary between the communication groove 46b and the bottom surface portion 44 of the flow path portion 45.

As illustrated in FIG. 2, the throttle portion 41 causes a radial width N1 near the inlet of the flow path portion 45 to exceed a radial width N2 near the outlet of the flow path portion 45. As a result, during sliding with the rotating seal ring 11, the pressure of the sealing target fluid that has flowed in from the communication port 40a communicating with the high-pressure fluid H side is gradually increased by the throttle portion 41 and positive pressure generation occurs between the sliding surface S1 of the fixed seal ring 12 and the sliding surface S2 of the rotating seal ring 11.

In addition, the plurality of dynamic pressure generation grooves 4 arranged along the circumferential direction in the sliding surface S1 have the same configuration and shape without exception and the communication port 40a as an introduction port in the dynamic pressure generation groove 4 is configured as the lead-out port of the dynamic pressure generation groove 4 adjacent to the upstream side of the dynamic pressure generation groove 4. In addition, the communication port 40b as a lead-out port in the dynamic pressure generation groove 4 is configured as the introduction port of the dynamic pressure generation groove 4 adjacent to the downstream side of the dynamic pressure generation groove 4.

In this manner, the introduction ports and the lead-out ports of the adjacent dynamic pressure generation grooves 4 are sequentially arranged in a communicating state, and thus the plurality of dynamic pressure generation grooves 4 communicate in an annular shape over the entire circumference of the sliding surface S1.

Although the dynamic pressure generation groove 4 forms a liquid film between the sliding surface S1 and the sliding surface S2 and improve lubricity by the throttle portion 41 generating the positive pressure, the seal surface M1 is flat, and thus the liquidtightness of the sliding surface S1 is retained even in the event of positive pressure generation by the dynamic pressure generation groove 4.

Figure 3:
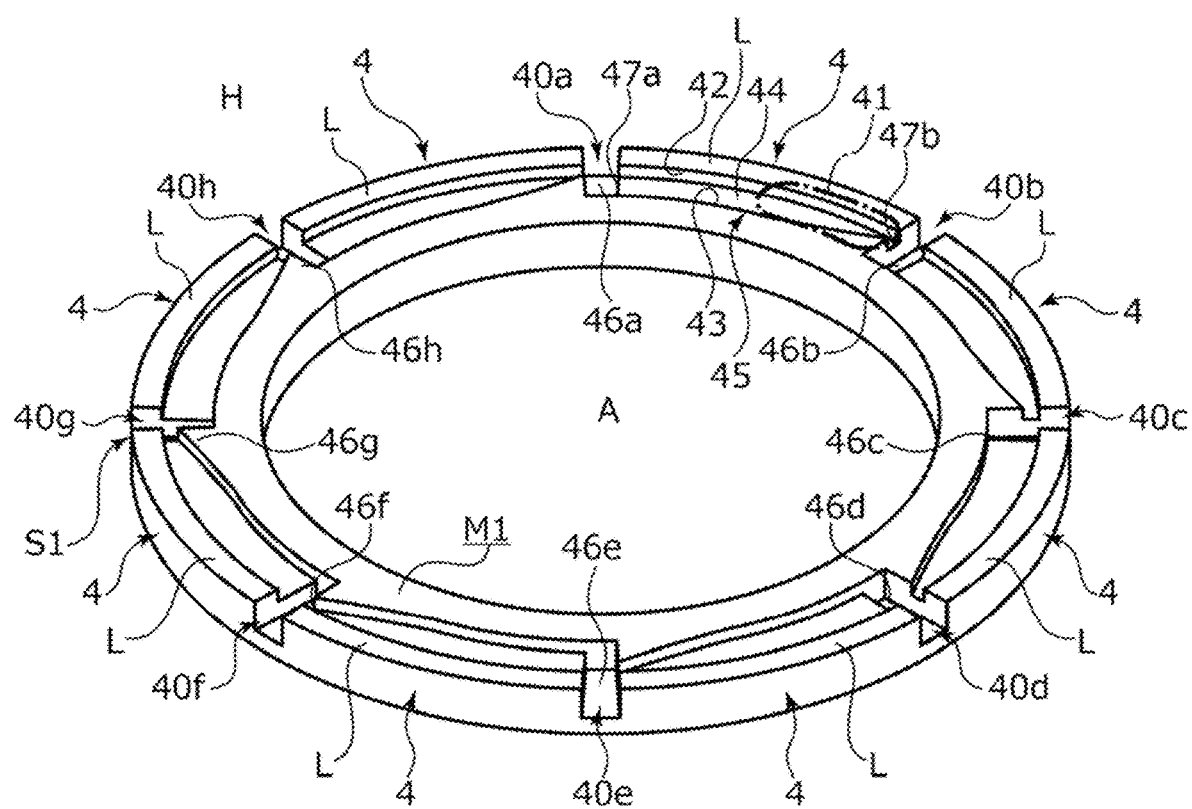
FIG. 3 is a perspective view illustrating the sliding component provided with the dynamic pressure generation groove in the first embodiment.

As illustrated in FIGS. 2 and 3, the sealing target fluid that has flowed into the communication port 40a as a result of the sliding of the sliding surface S1 and the sliding surface S2 flows into the flow path portion 45 from the communication groove 46a, which is a groove deeper than the bottom surface portion 44 of the flow path portion 45, over the step portion 47a. Although the positive pressure is gradually increased by the throttle portion 41 in the flow path portion 45, the step portion 47b is formed such that the positive pressure-increased sealing target fluid is led out to the communication groove 46b, and thus the pressure of the sealing target fluid that has moved to the communication groove 46b is released and the sealing target fluid is discharged to the high-pressure fluid H side from the communication port 40b. In addition, since the inner wall portion 43 of the flow path portion 45 forms the throttle portion 41, which has a flow path cross section gradually narrowing so as to become close toward the outer wall portion 42, the discharge from the communication port 40b is facilitated by centrifugal force.

In the communication groove 46b at this time, convection occurs between the flow of the sealing target fluid to flow out to the fluid H side (i.e., intra-machine side) after passage through the flow path portion 45 of the dynamic pressure generation groove 4 and positive pressure release and the sealing target fluid to flow into the communication groove 46b from the fluid H side (i.e., intra-machine side) as the introduction port of the dynamic pressure generation groove 4 adjacent to the downstream side and fluidity enhancement occurs as a result. Accordingly, the communication groove 46b causes the foreign matter contained in the sealing target fluid to actively flow and be easily led out to the high-pressure fluid H side. In addition, not only the communication groove 46b but also the communication grooves 46a to 46h constituting the plurality of dynamic pressure generation grooves 4 arranged in the circumferential direction have the same effect. In other words, the communication groove 46b discharging the sealing target fluid in the dynamic pressure generation groove 4 also serves as an introduction port for the fluid H in the dynamic pressure generation groove 4 adjacent thereto. Accordingly, the dynamic pressure generation groove 4 can be formed in an annular shape over the entire circumference in the sliding surface S1 of the fixed seal ring 12.

In addition, as illustrated in FIGS. 2 and 3, the fixed seal ring 12 in the first embodiment has the plurality of dynamic pressure generation grooves 4 arranged in the circumferential direction and mutually communicating in an annular shape over the entire circumference. Accordingly, even in the event of foreign matter intrusion from the communication port 40a, it circulates in the annular dynamic pressure generation groove 4, and thus it flows without staying in the dynamic pressure generation groove and is eventually discharged to the high-pressure fluid H side from any of the communication ports 40a to 40h.

Since the lead-out port of the dynamic pressure generation groove 4 communicates with the high-pressure fluid H side in this manner, foreign matter that has intruded into the dynamic pressure generation groove 4 from the introduction port can be discharged to the high-pressure fluid H side through the lead-out port and the foreign matter is prevented from staying or accumulating in the dynamic pressure generation groove 4. As a result, it is possible to realize low leakage, long life, and low torque over a long period of time.

In addition, in the throttle portion 41 in the present embodiment, the inner wall portion 43 is curved from the inner diameter side to the outer diameter side so as to gradually approach the outer wall portion 42 on the outer diameter side toward the communication port 40b along the circumferential direction. Accordingly, centrifugal force acts on the sealing target fluid and the foreign matter contained in the sealing target fluid and discharge to the high-pressure fluid H side on the outer diameter side is facilitated.

In addition, the plurality of dynamic pressure generation grooves 4 are arranged in the circumferential direction of the sliding surface S1 and the communication port 40b as the lead-out port of one adjacent dynamic pressure generation groove 4 and the communication port 40b as the introduction port of another dynamic pressure generation groove 4 are the same. Accordingly, the two dynamic pressure generation grooves 4 are capable of communicating with each other and the fluidity of the foreign matter contained in the sealing target fluid can be enhanced. It should be noted that the lead-out port of one adjacent dynamic pressure generation groove 4 and the introduction port of the other dynamic pressure generation groove 4 may be arranged side by side in a communicating state.

In addition, since the plurality of dynamic pressure generation grooves 4 are annularly arranged over the entire circumference of the sliding surface S1, foreign matter that has intruded into the annular dynamic pressure generation groove 4 from the communication port as an introduction port is discharged from any of the communication ports as a lead-out port while annularly circulating in the dynamic pressure generation groove 4. Accordingly, the foreign matter is unlikely to stay in the dynamic pressure generation groove 4.

In addition, the communication port 40a as an introduction port is formed in the groove in the throttle portion 41 of the flow path portion 45 deeper than the bottom surface portion 44, and thus a large amount of fluid can be introduced toward the throttle portion 41 from the communication port 40a formed in the deep groove.

In addition, the communication port 40b as a lead-out port is formed in the groove in the throttle portion 41 of the flow path portion 45 deeper than the bottom surface portion 44, and thus the communication port 40b formed in the deep groove achieves the effect of a pressure release groove and the sealing target fluid and the foreign matter contained in the fluid are led out with ease.

Second Embodiment

Next, the sliding component according to the second embodiment of the present invention will be described with reference to FIGS. 4 and 5. It should be noted that components identical to those of the first embodiment will be denoted by the same reference numerals with redundant description omitted.

Figure 4:
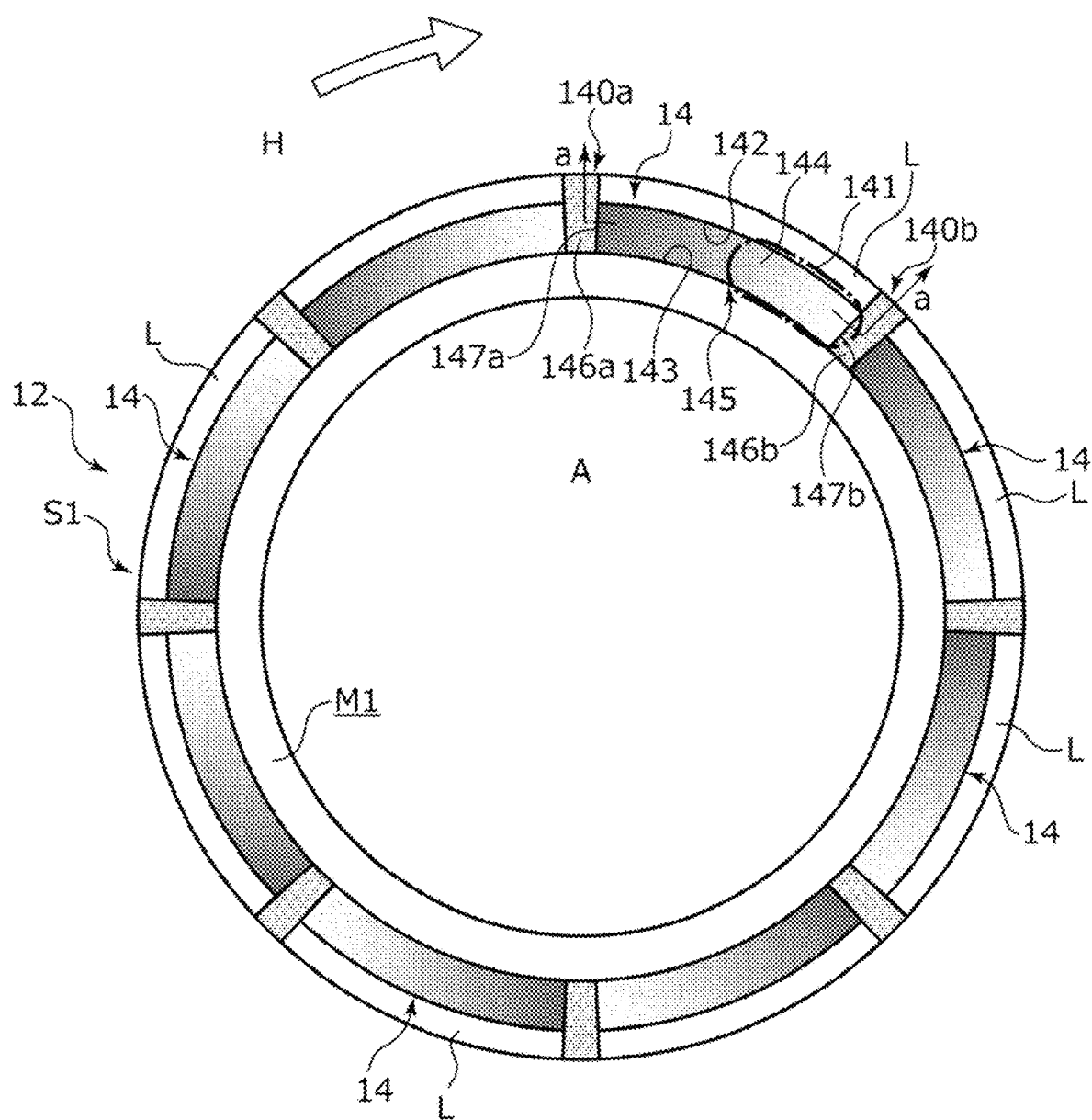
FIG. 4 is a front view illustrating a sliding surface provided with the dynamic pressure generation groove of a sliding component according to a second embodiment of the present invention.

As illustrated in FIG. 4, in a dynamic pressure generation groove 14 formed in the sliding surface S1 of the fixed seal ring 12, a flow path portion 145 communicating with a communication port 140a as an introduction port is formed such that each of an outer wall portion 142 and an inner wall portion 143 is formed concentrically with the fixed seal ring 12 and in a circular arc shape and is separate at equal intervals in the radial direction. In addition, a bottom surface portion 144 of the second embodiment is inclined at a constant angle from the lower surface to the upper surface from the upstream side toward the downstream side. Formed as a result is a throttle portion 141 that has a flow path cross section gradually narrowing in the circumferential direction over the entire flow path portion 145.

Figure 5:
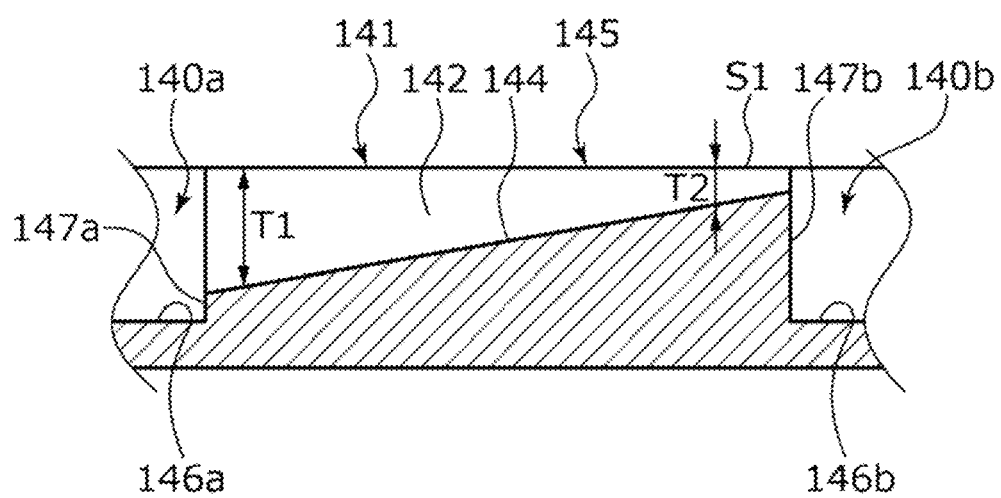
FIG. 5 is a cross-sectional view taken along line a-a of FIG. 4.

FIG. 5 is a side cross-sectional view of the flow path portion 145, in which a depth T2 from the sliding surface S1 on the communication groove 146b side as a lead-out port to the bottom surface of the bottom surface portion 144 is shallower than a depth T1 from the sliding surface S1 on the communication groove 146a side as an introduction port to the bottom surface of the bottom surface portion 144. In other words, the flow path cross-sectional area of the flow path portion 145 gradually decreases from the depth T1 toward the depth T2. As a result, the positive pressure of the sealing target fluid that has flowed in from the communication groove 146a during sliding increases as the sealing target fluid moves over a step portion 147a to the communication groove 146b side as the downstream side of the flow path portion 145. Subsequently, it is discharged to the high-pressure fluid H side from a communication port 140b of the communication groove 146b over a step portion 147b.

The effect of positive pressure generation can be enhanced since the throttle portion 141 is formed over the entire flow path portion 145 as described above. In addition, the throttle portion 141 is formed by the bottom surface portion 144 inclined at a constant angle, and thus a uniform and stable positive pressure generation effect can be obtained.

Third Embodiment

Next, the sliding component according to the third embodiment of the present invention will be described with reference to FIG. 6. It should be noted that components identical to those of the first and second embodiments will be denoted by the same reference numerals with redundant description omitted.

Figure 6:
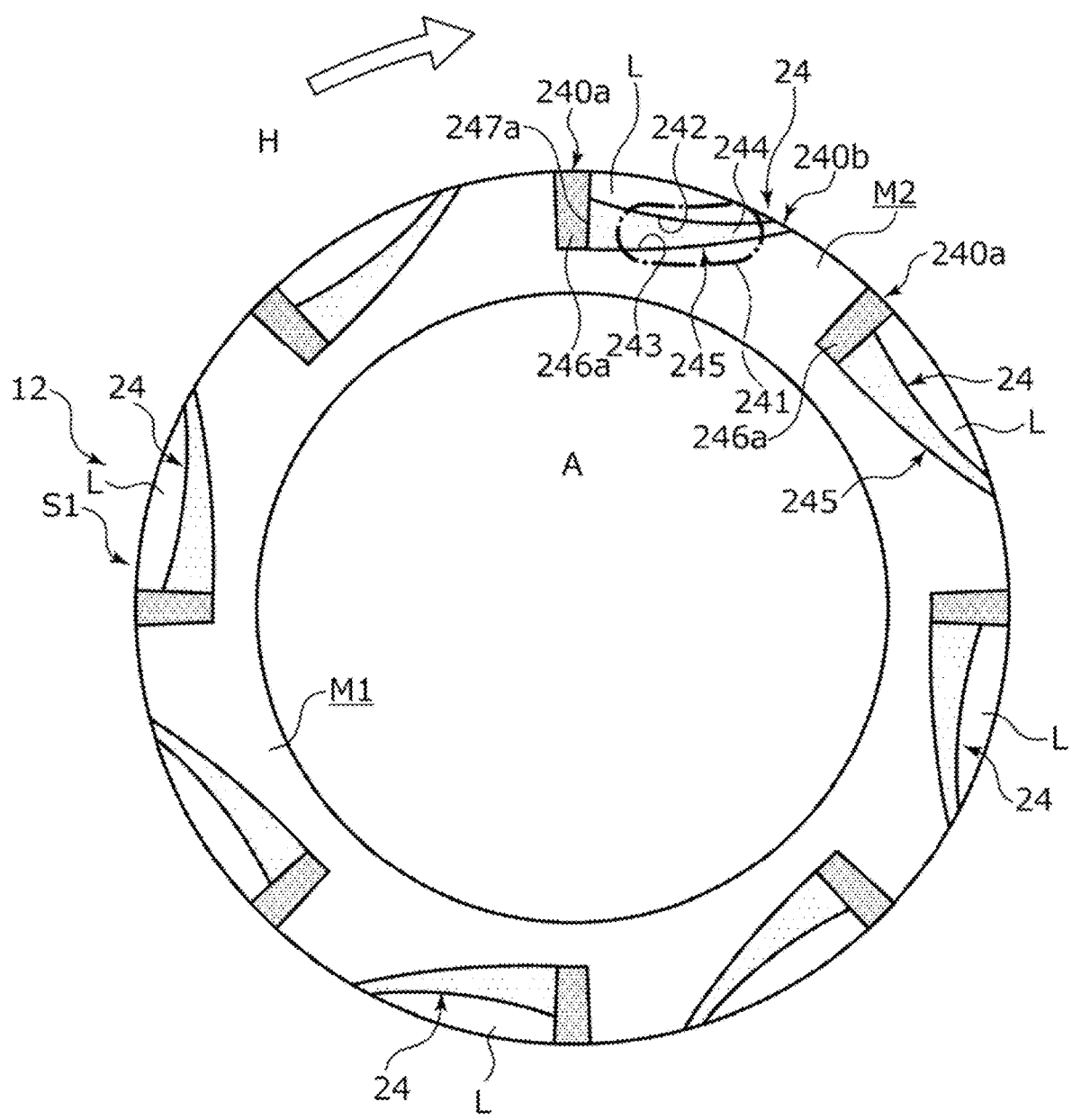
FIG. 6 is a front view illustrating a sliding surface provided with the dynamic pressure generation groove of a sliding component according to a third embodiment of the present invention.

As illustrated in FIG. 6, in a dynamic pressure generation groove 24 formed in the sliding surface S1 of the fixed seal ring 12, a flow path portion 245 communicating with a communication port 240a as an introduction port is formed by an outer wall portion 242 and an inner wall portion 243 being curved from the inner diameter side toward the outer diameter side of the fixed seal ring 12 along the circumferential direction. In addition, a communication port 240b as a lead-out port is open at the downstream outer diameter end of the flow path portion 245. The outer wall portion 242 and the inner wall portion 243 are formed as a throttle portion 241 by gradually approaching each other toward the communication port 240b along the circumferential direction.

In addition, a bottom surface portion 244 of the flow path portion 245 is formed on a flat surface having a constant depth shallower than the bottom surface of the communication groove 46a up to the throttle portion 241 and the communication port 240b.

In addition, a plurality of the dynamic pressure generation grooves 24 of the third embodiment are arranged along the circumferential direction in the sliding surface S1 of the fixed seal ring 12, the introduction ports and the lead-out ports of the adjacent dynamic pressure generation grooves 24 are separated from each other in the circumferential direction, and the part is formed as a seal surface M2.

The sealing target fluid that has flowed in from the communication port 240a illustrated in FIG. 6 flows into the flow path portion 245 over a step portion 247a. The positive pressure of the sealing target fluid that has flowed into the flow path portion 245 is increased by the throttle portion 241 formed by the outer wall portion 242 and the inner wall portion 243. Subsequently, it is discharged from the communication port 240b to the high-pressure fluid H side.

The adjacent dynamic pressure generation grooves 24 of the present embodiment are separated from each other in the circumferential direction, and thus lubricity is enhanced by the plurality of dynamic pressure generation grooves 24. In addition, the part where the dynamic pressure generation grooves 24 are separated from each other is capable of maintaining sealability as the seal surface M2.

In addition, in the throttle portion 241 in the present embodiment, the outer wall portion 242 and the inner wall portion 243 are curved from the inner diameter side toward the outer diameter side toward the communication port 240b along the circumferential direction, and thus centrifugal force acts on the sealing target fluid and the foreign matter contained in the sealing target fluid and the fluid is easily discharged to the high-pressure fluid H side on the outer diameter side. In addition, in the throttle portion 241, each of the outer wall portion 242 and the inner wall portion 243 forms the throttle portion 241 by being convexly curved from the outer diameter side toward the inner diameter side of the sliding surface, and thus centrifugal force acts with ease.

Fourth Embodiment

Next, the sliding component according to the fourth embodiment of the present invention will be described with reference to FIG. 7. It should be noted that components identical to those of the first to third embodiments will be denoted by the same reference numerals with redundant description omitted.

Figure 7:
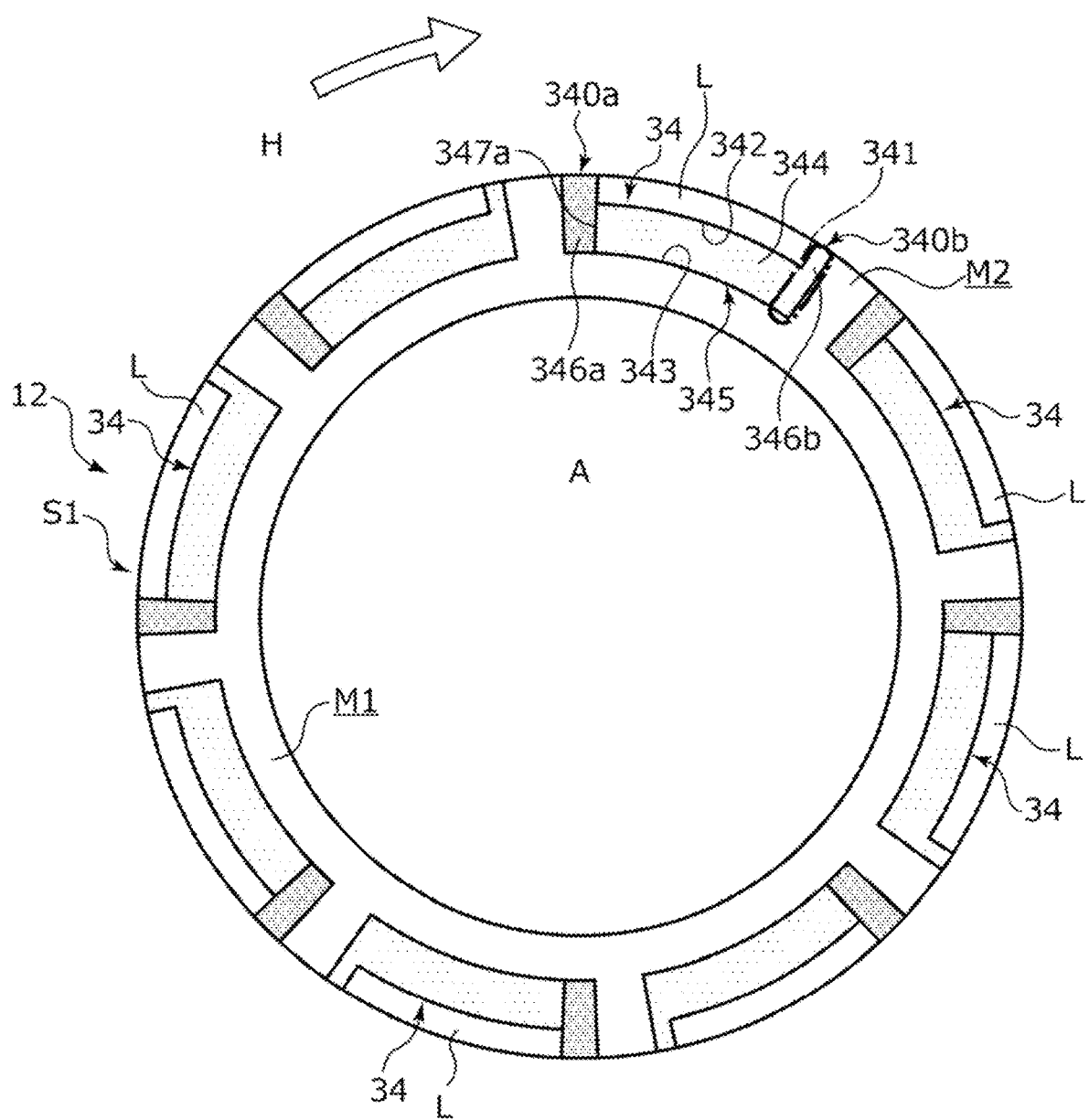
FIG. 7 is a front view illustrating a sliding surface provided with the dynamic pressure generation groove of a sliding component according to a fourth embodiment of the present invention.

As illustrated in FIG. 7, in a dynamic pressure generation groove 34 formed in the sliding surface S1 of the fixed seal ring 12, a flow path portion 345 communicating with a communication port 340a as an introduction port has an outer wall portion 342 and an inner wall portion 343 circumferentially extending in a circular arc shape concentric with the fixed seal ring 12 along the circumferential direction. In addition, the downstream side of the flow path portion 345 is bent toward a communication port 340b as a lead-out port open at the outer diameter end, extends in the outer diameter direction, and is formed as a throttle portion 341 narrow in the circumferential direction. In other words, the circumferential width of the throttle portion 341 and the communication port 340b is narrower than that of a communication groove 346a provided with the communication port 340a. In addition, a bottom surface portion 344 of the flow path portion 345 is formed on a flat surface having a constant depth shallower than the bottom surface of the communication groove 346a up to the throttle portion 341 and the communication port 340b.

In addition, a plurality of the dynamic pressure generation grooves 34 of the fourth embodiment are arranged along the circumferential direction in the sliding surface S1 of the fixed seal ring 12, the introduction ports and the lead-out ports of the adjacent dynamic pressure generation grooves 34 are separated from each other in the circumferential direction, and the part is formed as the seal surface M2.

The sealing target fluid that has flowed in from the communication port 340a illustrated in FIG. 7 flows into the flow path portion 345 over a step portion 347a. The positive pressure of the sealing target fluid that has flowed into the flow path portion 345 is increased by the narrow throttle portion 341 bent in the radial direction from the flow path portion 345. Subsequently, it is discharged from the communication port 340b to the high-pressure fluid H side.

The adjacent dynamic pressure generation grooves 34 of the present embodiment are separated from each other in the circumferential direction, and thus lubricity is enhanced by the plurality of dynamic pressure generation grooves 34. In addition, the part where the dynamic pressure generation grooves 34 are separated from each other is capable of maintaining sealability as the seal surface M2.

Fifth Embodiment

Next, the sliding component according to the fifth embodiment of the present invention will be described with reference to FIG. 8. It should be noted that components identical to those of the first to fourth embodiments will be denoted by the same reference numerals with redundant description omitted.

Figure 8:
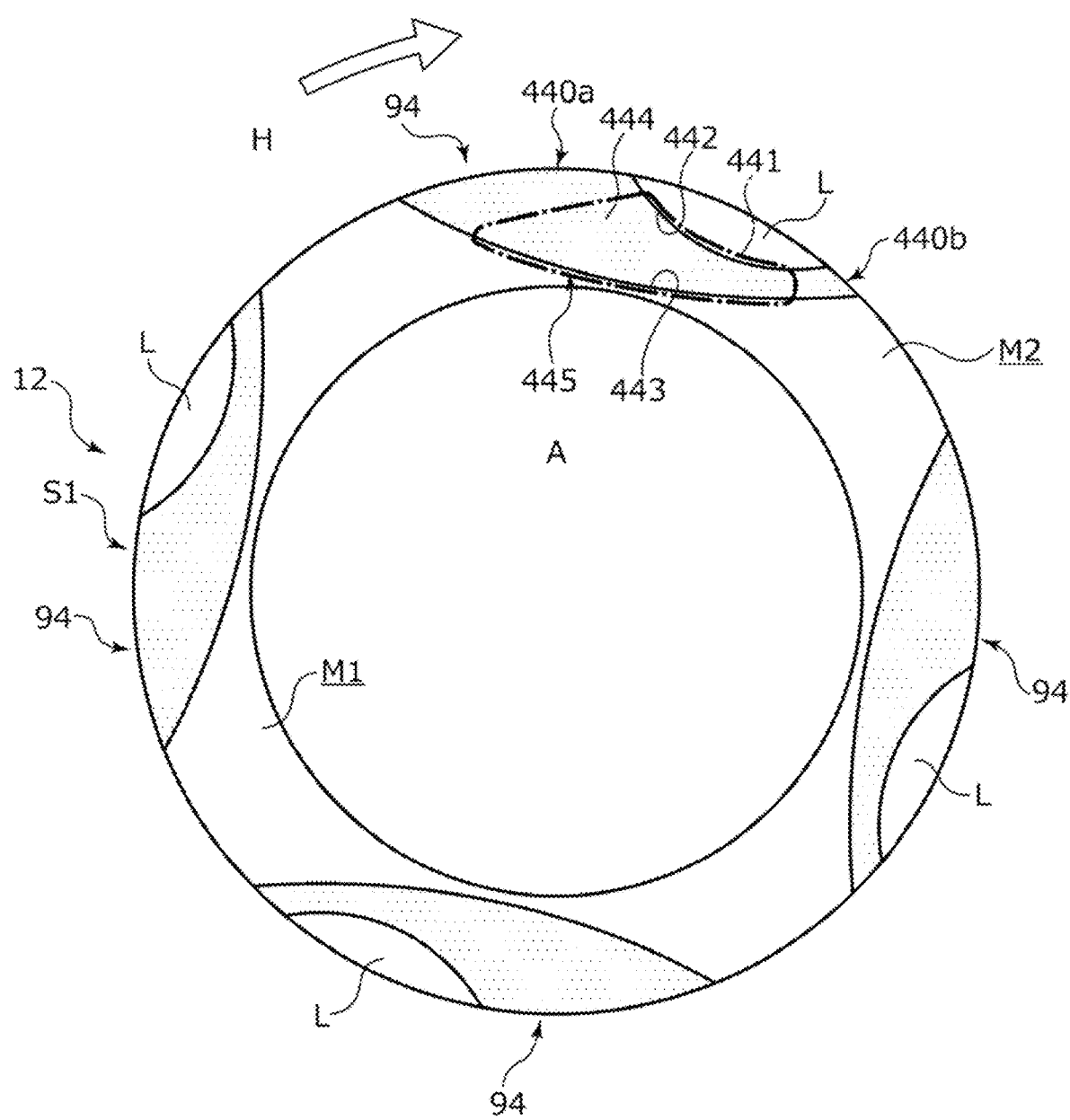
FIG. 8 is a front view illustrating a sliding surface provided with the dynamic pressure generation groove of a sliding component according to a fifth embodiment of the present invention.

As illustrated in FIG. 8, in a dynamic pressure generation groove 94 formed in the sliding surface S1 of the fixed seal ring 12, a flow path portion 445 communicating with a communication port 440a as an introduction port has an outer wall portion 442 and an inner wall portion 443 curved from the inner diameter side toward the outer diameter side of the fixed seal ring 12 along the circumferential direction. A communication port 440b as a lead-out port is open at the downstream outer diameter end of the flow path portion 445. The outer wall portion 442 and the inner wall portion 443 are formed as a throttle portion 441 by gradually approaching each other toward the communication port 440b along the circumferential direction. The communication port 440a as the introduction port of the dynamic pressure generation groove 94 is considerably wider in the circumferential direction than the communication port 440b as a lead-out port.

In addition, a bottom surface portion 444 of the flow path portion 445 is formed on a flat surface having a constant depth up to the communication port 440a, the throttle portion 441, and the communication port 440b.

In addition, a plurality of the dynamic pressure generation grooves 94 of the fifth embodiment are arranged along the circumferential direction in the sliding surface S1 of the fixed seal ring 12, the introduction ports and the lead-out ports of the adjacent dynamic pressure generation grooves 94 are separated from each other in the circumferential direction, and the part is formed as the seal surface M2.

The positive pressure of the sealing target fluid that has flowed into the flow path portion 445 from the communication port 440a illustrated in FIG. 8 is increased by the throttle portion 441 formed by the outer wall portion 442 and the inner wall portion 443. Subsequently, it is discharged from the communication port 440b to the high-pressure fluid H side.

The adjacent dynamic pressure generation grooves 94 of the present embodiment are separated from each other in the circumferential direction, and thus lubricity is enhanced by the plurality of dynamic pressure generation grooves 94. In addition, the part where the dynamic pressure generation grooves 94 are separated from each other is capable of maintaining sealability as the seal surface M2.

In addition, in the throttle portion 441 in the present embodiment, the outer wall portion 442 and the inner wall portion 443 are curved from the inner diameter side toward the outer diameter side toward the communication port 440b along the circumferential direction, and thus centrifugal force acts on the sealing target fluid and the foreign matter contained in the sealing target fluid and the fluid is easily discharged to the high-pressure fluid H side on the outer diameter side. In addition, in the throttle portion 441, each of the outer wall portion 442 and the inner wall portion 443 forms the throttle portion 441 by being convexly curved from the outer diameter side toward the inner diameter side of the sliding surface, and thus centrifugal force acts with ease.

Sixth Embodiment

Next, the sliding component according to the sixth embodiment of the present invention will be described with reference to FIG. 9. It should be noted that components identical to those of the first to fifth embodiments will be denoted by the same reference numerals with redundant description omitted.

Figure 9:
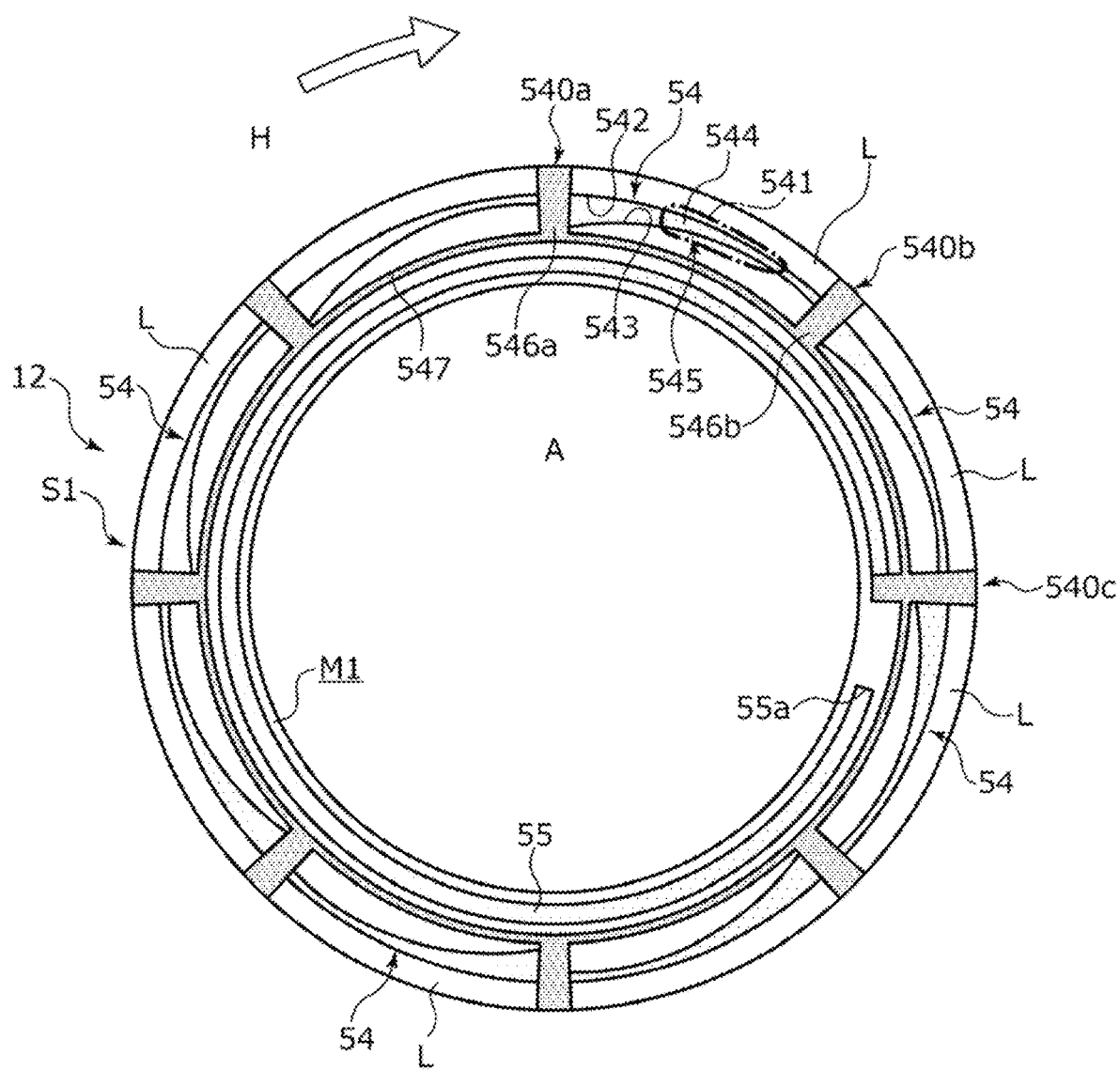
FIG. 9 is a front view illustrating a sliding surface provided with the dynamic pressure generation groove of a sliding component according to a sixth embodiment of the present invention.

As illustrated in FIG. 9, in a dynamic pressure generation groove 54 formed in the sliding surface S1 of the fixed seal ring 12, a flow path portion 545 communicating with a communication port 540a as an introduction port includes a throttle portion 541 gradually decreasing in width from the communication groove 546a side toward the communication groove 546b side along the circumferential direction and communicates with a communication port 540b as a lead-out port. The narrow throttle portion 541 is formed by an inner wall portion 543 gradually approaching the outer diameter side along the circumferential direction with respect to an outer wall portion 542 circumferentially extending in a circular arc shape concentric with the fixed seal ring 12.

In addition, the communication port 540a as an introduction port in the dynamic pressure generation groove 54 is configured as the lead-out port of the dynamic pressure generation groove 54 adjacent to the upstream side of the dynamic pressure generation groove 54. In addition, the communication port 540b as a lead-out port in the dynamic pressure generation groove 54 is configured as the introduction port of the dynamic pressure generation groove 54 adjacent to the downstream side of the dynamic pressure generation groove 54.

In this manner, the introduction ports and the lead-out ports of the adjacent dynamic pressure generation grooves 4 are sequentially arranged in a communicating state, and thus the plurality of dynamic pressure generation grooves 4 communicate in an annular shape over the entire circumference of the sliding surface S1.

Further, all the inner diameter ends of the plurality of communication grooves 546a, 546b, and so on arranged in the circumferential direction are continuously formed in an annular shape by an annular groove 547 having the same depth as the communication grooves.

In addition, a communication port 540c extends to the inner diameter side beyond the annular groove 547 and communicates with a negative pressure generation groove 55 shallower than the communication port 540c. The negative pressure generation groove 55 extends in the circumferential direction from the communication port 540c toward the upstream side, and a circumferential end surface 55a is formed as a step portion in relation to the sliding surface S1 on the front side of the lap.

In this manner, a plurality of the dynamic pressure generation grooves 54 are annularly arranged over the entire circumference of the sliding surface S1, and thus foreign matter that has intruded into the annular dynamic pressure generation groove 54 from the communication ports 540a and 540b and so on as introduction ports is discharged from any of the communication ports 540b and 540c and so on as a lead-out port while annularly circulating in the dynamic pressure generation groove 54. Accordingly, the foreign matter is unlikely to stay in the dynamic pressure generation groove 54.

In addition, since the annular groove 547 communicating with all the circumferentially arranged communication grooves is formed, the sealing target fluid on the fluid H side can be introduced and led out to the fluid H side with ease and the fluidity of the foreign matter contained in the sealing target fluid can be enhanced.

The dynamic pressure generation groove 54 generates a positive pressure on the outer diameter side of the sliding surface S1 by means of the throttle portion 541, slightly widens the gap with the sliding surface S2, and forms a liquid film between the sliding surfaces to improve lubricity. In addition, the negative pressure generation groove 55 narrows the gap with the sliding surface S2 by generating a negative pressure on the inner diameter side of the sliding surface S1 to enhance the liquidtightness between the sliding surfaces.

In addition, in the throttle portion 541 in the present embodiment, the inner wall portion 543 is curved from the inner diameter side to the outer diameter side so as to gradually approach the outer wall portion 542 toward the communication port 540b along the circumferential direction. Accordingly, centrifugal force acts on the sealing target fluid and the foreign matter contained in the sealing target fluid and the fluid is easily discharged to the high-pressure fluid H side on the outer diameter side.

Seventh Embodiment

Next, the sliding component according to the seventh embodiment of the present invention will be described with reference to FIG. 10. It should be noted that components identical to those of the first to sixth embodiments will be denoted by the same reference numerals with redundant description omitted.

Figure 10:
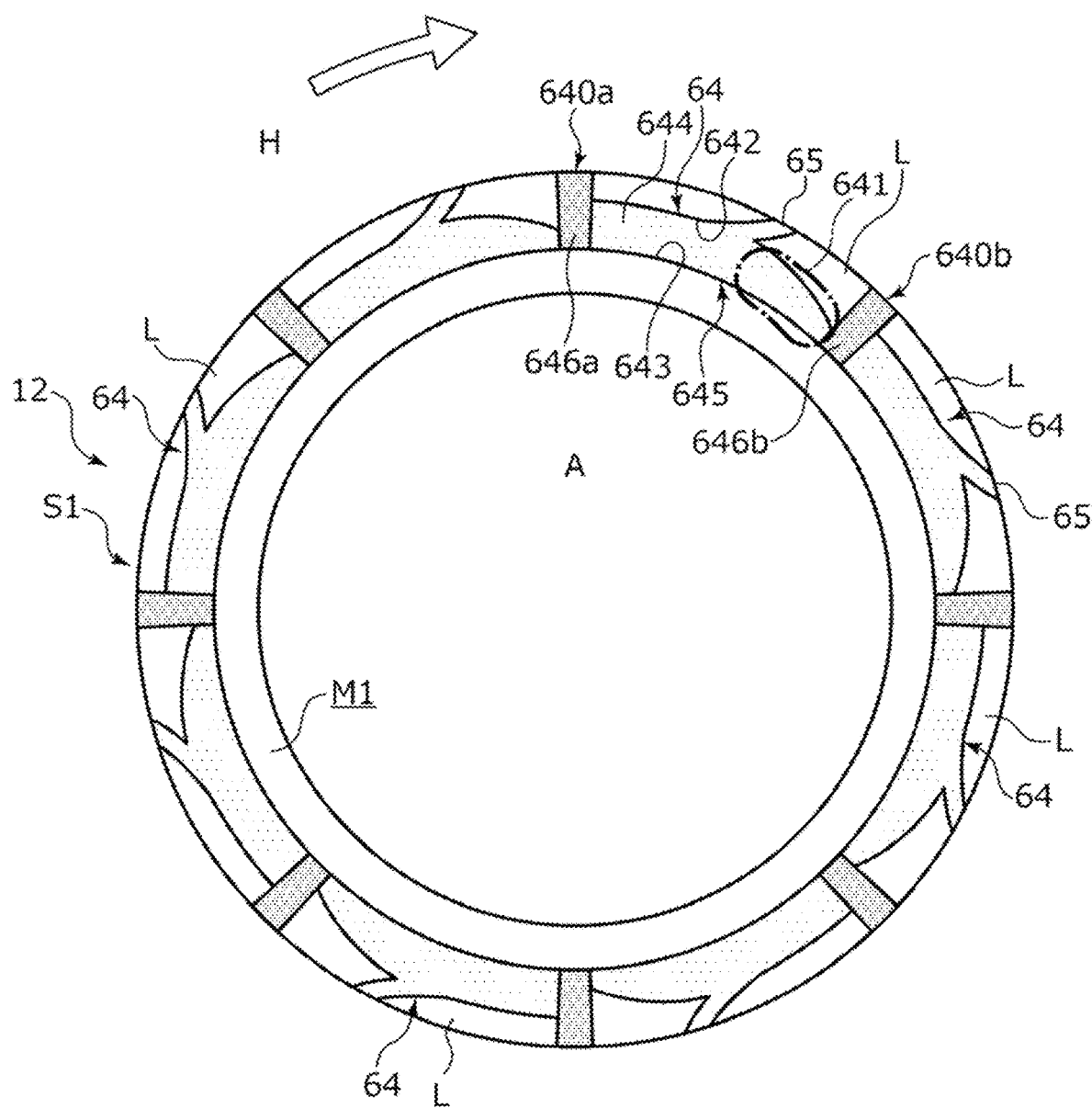
FIG. 10 is a front view illustrating a sliding surface provided with the dynamic pressure generation groove of a sliding component according to a seventh embodiment of the present invention.

As illustrated in FIG. 10, in a dynamic pressure generation groove 64 formed in the sliding surface S1 of the fixed seal ring 12, a flow path portion 645 communicating with a communication port 640a as an introduction port includes a throttle portion 641 gradually decreasing in width from the communication groove 646a side toward the communication groove 646b side along the circumferential direction and communicates with a communication port 640b as a lead-out port. The narrow throttle portion 641 is formed by an outer wall portion 644 gradually approaching the inner diameter side along the circumferential direction with respect to an inner wall portion 643 circumferentially extending in a circular arc shape concentric with the fixed seal ring 12.

In addition, the flow path portion 645 includes a communication port 65 as another lead-out port branching to the outer diameter side upstream of the throttle portion 641 and opening at the outer diameter end. The communication port 65 is smaller in cross-sectional area than the flow path portion 645 extending in the circumferential direction. More preferably, the communication port 65 is smaller in cross-sectional area than the throttle portion 641.

As described above, the dynamic pressure generation groove 64 has the communication port 640b and the communication port 65 as lead-out ports. Accordingly, foreign matter that has intruded from the introduction port can be easily discharged via the plurality of communication ports 640b and 65.

Eighth Embodiment

Next, the sliding component according to the eighth embodiment of the present invention will be described with reference to FIG. 11. It should be noted that components identical to those of the first to seventh embodiments will be denoted by the same reference numerals with redundant description omitted.

Figure 11:
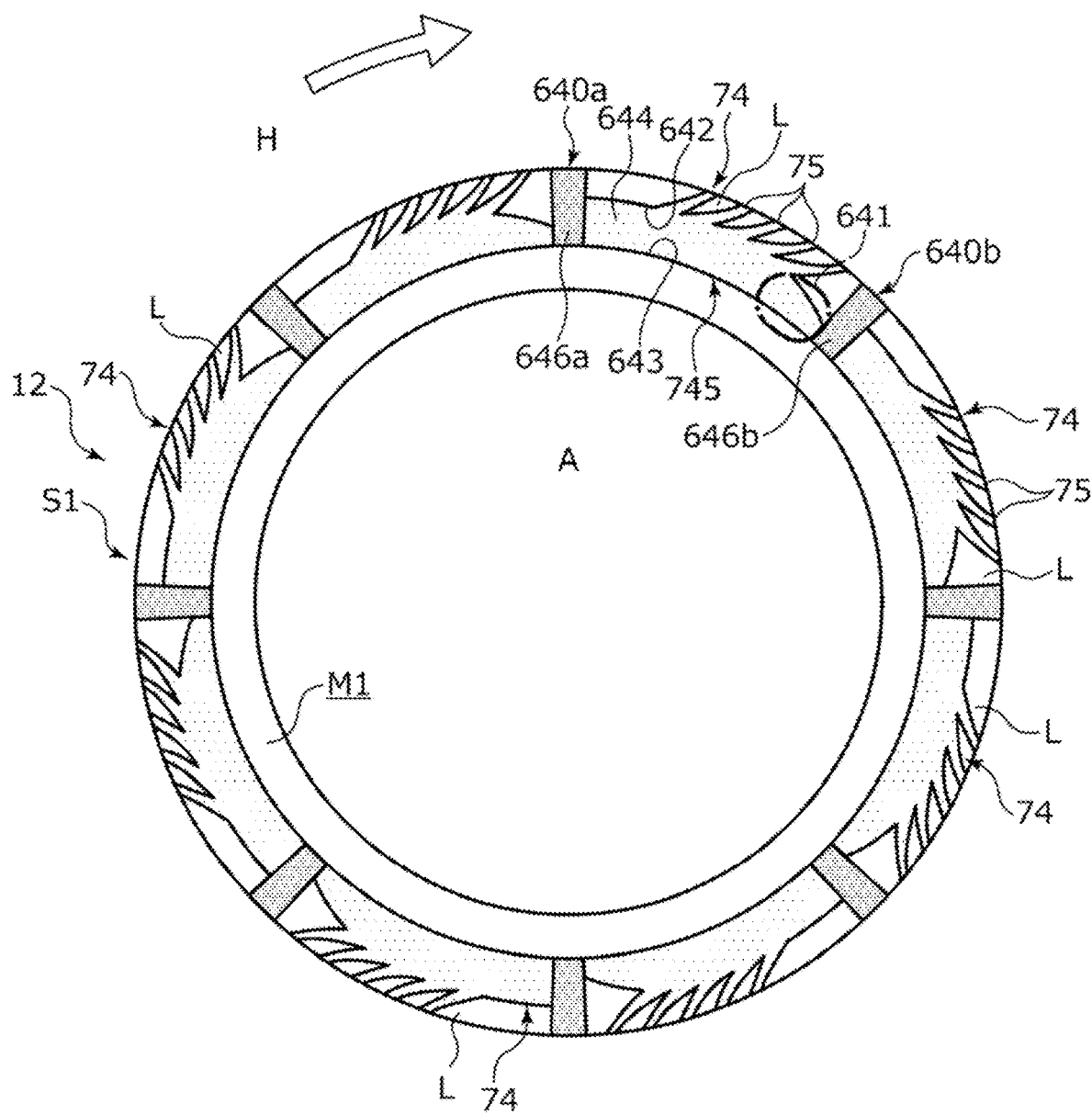
FIG. 11 is a front view illustrating a sliding surface provided with the dynamic pressure generation groove of a sliding component according to an eighth embodiment of the present invention.

As illustrated in FIG. 11, in a dynamic pressure generation groove 74 formed in the sliding surface S1 of the fixed seal ring 12, a flow path portion 745 communicating with the communication port 640a as an introduction port includes the throttle portion 641 gradually decreasing in width from the communication groove 646a side toward the communication groove 646b side along the circumferential direction and communicates with the communication port 640b as a lead-out port.

In addition, the flow path portion 745 includes a plurality of communication ports 75 as separate lead-out ports branching to the outer diameter side at a plurality of circumferential points upstream of the throttle portion 641 and opening at the outer diameter end. The communication port 75 is smaller in cross-sectional area than the flow path portion 745 extending in the circumferential direction. More preferably, the communication port 75 is smaller in cross-sectional area than the throttle portion 641.

As described above, the dynamic pressure generation groove 74 has the communication port 640b and the plurality of communication ports 75 as lead-out ports. Accordingly, foreign matter that has intruded from the introduction port can be easily discharged via the plurality of communication ports 640b and 75.

Although embodiments of the present invention have been described above with reference to the drawings, the specific configuration is not limited to the embodiments.

For example, although the dynamic pressure generation grooves of the embodiments are provided in the sliding surface S1 of the fixed seal ring 12, the present invention is not limited thereto. For example, the dynamic pressure generation groove may be provided in the sliding surface S2 of the rotating seal ring 11.

In addition, although a case where the outer diameter side of the seal ring is the high-pressure fluid H has been described above, the inner diameter side of the seal ring may be the fluid H as the sealing target fluid. In this case, the sliding component 1 is configured to be provided with the dynamic pressure generation groove 4 where the communication ports 40a to 40h communicate with the fluid H on the inner diameter side.

In addition, although a case where the sealing target fluid that is introduced into the dynamic pressure generation groove and led out is the fluid H on the high-pressure side has been described in the embodiments, the present invention is not limited thereto and the sealing target fluid may be a fluid on the low-pressure side.

REFERENCE SIGNS LIST

1 Sliding component
2 Rotary shaft
3 Seal cover
4 Dynamic pressure generation groove
10 Mechanical seal
11 Rotating seal ring
12 Fixed seal ring
40a to 40h Communication port (introduction port, lead-out port)
41 Throttle portion
45 Flow path portion
46a to 46h Communication groove
14 Dynamic pressure generation groove
140a, 140b Communication port (introduction port, lead-out port)
141 Throttle portion
24 Dynamic pressure generation groove
240a, 240b Communication port (introduction port, lead-out port)
241 Throttle portion
34 Dynamic pressure generation groove
340a, 340b Communication port (introduction port, lead-out port)
341 Throttle portion
94 Dynamic pressure generation groove
440a, 440b Communication port (introduction port, lead-out port)
441 Throttle portion
54 Dynamic pressure generation groove
540a to 540c Communication port (introduction port, lead-out port)
541 Throttle portion
64 Dynamic pressure generation groove
640a, 640b Communication port (introduction port, lead-out port)
641 Throttle portion
65 Communication port (lead-out port)
74 Dynamic pressure generation groove
75 Communication port (lead-out port)

The invention claimed is:

1. A sliding component comprising at least a dynamic pressure generation groove configured for generating a dynamic pressure on a sliding surface of the sliding component,
   Wherein each dynamic pressure generation groove includes:
   an introduction port which is formed in a first end side of the dynamic pressure generation groove in a circumferential direction and which is open to a sealing target fluid side;
   a throttle portion communicating with the introduction port and having a narrowed flow path; and
   a lead-out port which is formed on a second end side of the dynamic pressure generation groove opposed to the first end side in the circumferential direction, which communicates with the throttle portion and which is open to the sealing target fluid side, wherein
   the introduction port is formed so as to be a deep groove deeper than the throttle portion.

2. The sliding component according to claim 1 wherein the dynamic pressure generation grooves are arranged in the circumferential direction in the sliding surface, and
   the lead-out port of each dynamic pressure generation groove and the introduction port of adjacent dynamic pressure generation groove communicate with each other.

3. The sliding component according to claim 2, wherein the dynamic pressure generation grooves communicate in an annular shape over an entire circumference of the sliding surface.

4. The sliding component according to claim 1, wherein the dynamic pressure generation grooves are arranged in the circumferential direction in the sliding surface, and
   the dynamic pressure generation grooves are separated from each other in the circumferential direction.

5. The sliding component according to claim 1, wherein the throttle portion is curved from an inner diameter side toward an outer diameter side of the sliding surface as the throttle portion extends to the lead-out port.

6. The sliding component according to claim 1, wherein the throttle portion is curved from an inner diameter side toward an outer diameter side of the sliding surface as the throttle portion extends to the lead-out port.

7. A sliding component comprising at least a dynamic pressure generation groove configured for generating a dynamic pressure on a sliding surface of the sliding component,
wherein each dynamic pressure generation groove includes:
an introduction port which is formed in a first end side of the dynamic pressure generation groove in a circumferential direction and which is open to a sealing target fluid side;
a throttle portion communicating with the introduction port and having a narrowed flow path; and
a lead-out port which is formed on a second end side of the dynamic pressure generation groove opposed to the first end side in the circumferential direction, which communicates with the throttle portion and which is open to the sealing target fluid side, wherein the lead-out port is formed so as to be a deep groove deeper than the throttle portion.

8. The sliding component according to claim 7,
the dynamic pressure generation grooves are arranged in the circumferential direction in the sliding surface, and
the lead-out port of each dynamic pressure generation groove and the introduction port of adjacent dynamic pressure generation groove communicate with each other the introduction port, the throttle portion, and the lead-out port are formed so as to be equal to each other in depth.

9. The sliding component according to claim 8, wherein the dynamic pressure generation grooves communicate in an annular shape over an entire circumference of the sliding surface.

10. The sliding component according to claim 7, wherein the dynamic pressure generation grooves are arranged in the circumferential direction in the sliding surface, and
the dynamic pressure generation grooves are separated from each other in the circumferential direction.

11. The sliding component according to claim 7, wherein the throttle portion is curved from an inner diameter side toward an outer diameter side of the sliding surface as the throttle portion extends to the lead-out port.

12. A sliding component comprising at least a dynamic pressure generation groove configured for generating a dynamic pressure on a sliding surface of the sliding component,
wherein each dynamic pressure generation groove includes:
an introduction port which is formed in a first end side of the dynamic pressure generation groove in a circumferential direction and which is open to a sealing target fluid side;
a throttle portion communicating with the introduction port and having a narrowed flow path; and
a lead-out port which is formed on a second end side of the dynamic pressure generation groove opposed to the first end side in the circumferential direction, which communicates with the throttle portion and which is open to the sealing target fluid side, wherein
the introduction port, the throttle portion, and the lead-out port are formed so as to be equal to each other in depth.

13. The sliding component according to claim 12, wherein the dynamic pressure generation grooves are arranged in the circumferential direction in the sliding surface, and
the lead-out port of each dynamic pressure generation groove and the introduction port of adjacent dynamic pressure generation groove communicate with each other.

14. The sliding component according to claim 13, wherein the dynamic pressure generation grooves communicate in an annular shape over an entire circumference of the sliding surface.

15. The sliding component according to claim 12, wherein the dynamic pressure generation grooves are arranged in the circumferential direction in the sliding surface, and
the dynamic pressure generation grooves are separated from each other in the circumferential direction.

16. A sliding component comprising at least a dynamic pressure generation groove configured for generating a dynamic pressure on a sliding surface of the sliding component,
wherein each dynamic pressure generation groove includes:
an introduction port which is formed in a first end side of the dynamic pressure generation groove in a circumferential direction and which is open to a sealing target fluid side;
a throttle portion communicating with the introduction port and having a narrowed flow path; and
a lead-out port which is formed on a second end side of the dynamic pressure generation groove opposed to the first end side in the circumferential direction, which communicates with the throttle portion and which is open to the sealing target fluid side, wherein
the dynamic pressure generation groove further includes at least another lead-out port.

17. The sliding component according claim 16, wherein the dynamic pressure generation grooves are arranged in the circumferential direction in the sliding surface, and
the lead-out port of each dynamic pressure generation groove and the introduction port of adjacent the dynamic pressure generation groove communicate with each other.

18. The sliding component according to claim 17, wherein the dynamic pressure generation grooves communicate in an annular shape over an entire circumference of the sliding surface.

19. The sliding component according to claim 16, wherein the dynamic pressure generation grooves are arranged in the circumferential direction in the sliding surface, and
the dynamic pressure generation grooves are separated from each other in the circumferential direction.

20. The sliding component according to claim 16, wherein the throttle portion is curved from an inner diameter side toward an outer diameter side of the sliding surface as the throttle portion extends to the lead-out port.

21. A sliding component comprising at least a dynamic pressure generation groove configured for generating a dynamic pressure on a sliding surface of the sliding component,
wherein each dynamic pressure generation groove includes:
an introduction port which is formed in a first end side of the dynamic pressure generation groove in a circumferential direction and which is open to a sealing target fluid side;
a throttle portion communicating with the introduction port and having a narrowed flow path; and
a lead-out port which is formed on a second end side of the dynamic pressure generation groove opposed to the first end side in the circumferential direction, which communicates with the throttle portion and which is open to the sealing target fluid side, wherein
the introduction port is formed so as to be a wide groove wider than the throttle portion.

22. The sliding component according to claim 21, wherein
the dynamic pressure generation grooves are arranged in the circumferential direction in the sliding surface, and
the lead-out port of each dynamic pressure generation groove and the introduction port of adjacent dynamic pressure generation groove communicate with each other.

23. The sliding component according to claim 22, wherein
the dynamic pressure generation grooves communicate in an annular shape over an entire circumference of the sliding surface.

24. The sliding component according to claim 21, wherein
the dynamic pressure generation grooves are arranged in the circumferential direction in the sliding surface, and
the dynamic pressure generation grooves are separated from each other in the circumferential direction.

25. The sliding component according to claim 21, wherein
the throttle portion is curved from an inner diameter side toward an outer diameter side of the sliding surface as the throttle portion extends to the lead-out port.

\* \* \* \* \*